Patented Dec. 26, 1939

2,184,697

UNITED STATES PATENT OFFICE 2,184,697

PURIFICATION OF TRICRESYL PHOSPHATE USED FOR THE EXTRACTION OF PHENOLS

Hinrich Havemann and Karl Smeykal, Leuna, Germany, assignors to I. G. Farbenindustrie Aktiengesellschaft, Frankfort - on - the-Main, Germany No Drawing. Application May 5, 1936, Serial No. 77,988. In Germany May 24, 1935

8 Claims. (Cl. 260—461)

The present invention relates to improvements in the purification of tricresyl phosphate used for the extraction of phenols.

In the extraction of phenols from distillation, reduction and low temperature carbonization waste aqueous liquors, such as are formed by the low temperature carbonization or destructive hydrogenation of coals, by means of tricresyl phosphate, it has been found that the tricresyl phosphate absorbs from such waste aqueous liquors not only the phenols but also organic substances of high molecular weight which remain in the tricresyl phosphate after the phenols have been expelled. These substances impart to the tricresyl phosphate a strong emulsifiability with water, whereby waste of extraction agent occurs and its further employment is rendered difficult and finally even quite impossible. In order to regenerate the tricresyl phosphate contaminated in the said manner, it has hitherto been subjected to a vacuum distillation which is however very expensive by reason of the high boiling point of the tricresyl phosphate and very wasteful by reason of the decompositions taking place to a great extent at the high temperatures and by reason of the presence of substances of high molecular weight.

We have now found that the substances in the tricresyl phosphate which cause the emulsion can be advantageously separated by treatment with concentrated sulphuric acid or sulphuric acid containing sulphur trioxide and then isolated from the tricresyl phosphate. It is preferable to add solvents, as for example carbon disulphide or carbon tetrachloride, because then the precipitated substances can be removed more readily. It has further been found to be especially advantageous, after the treatment of the tricresyl phosphate with the sulphuric acid to combine the excess of acid with neutralizing agents, as for example the hydroxides or carbonates of the alkaline earth metals and/or adsorption agents, as for example Florida earth. The separated substances are then capable of ready filtration or centrifuging so that in this case the use of solvents may be dispensed with.

The amount of sulphuric acid to be added is dependent on the content of emulsifying substances in the tricresyl phosphate and may readily be ascertained by experiment. It usually is between 0.5 and 5 per cent by volume of the tricresyl phosphate to be purified. 96 per cent, 100 per cent of fuming sulphide acid up to a sulphur trioxide content of 80 per cent is suitable for the purification. If solvents are employed, there is added an amount of solvent of from half to the same volume as the tricresyl phosphate. In order to obtain a readily filtered or centrifuged precipitate, an amount of neutralizing agent is added sufficient to combine with the free acid and the whole is then preferably heated.

The tricresyl phosphate purified in this manner is practically free from substances which cause the emulsification with water and may be employed again in the same manner for the extraction of phenols as freshly distilled tricresyl phosphate. During the purification, only a few per cent of tricresyl phosphate which are retained in the separated residue are lost even when the residue is not washed with any solvent after the centrifuging.

The process may also be employed for tricresyl phosphate which contains other tarry substances in addition to substances having an emulsifying action.

The following examples will further illustrate the nature of this invention but the invention is not restricted to these examples. The parts are by volume.

Example 1

100 parts of a tricresyl phosphate which has been used for the extraction of waste aqueous liquor containing phenol derived from the destructive hydrogenation of coal and which is so much contaminated with emulsifying substances that after shaking for five minutes with an equal volume of water 70 per cent by volume of the same are absorbed, are thoroughly shaken with 1 part of 20 per cent oleum at ordinary temperature. The resulting precipitate which is suspended in the tricresyl phosphate is sharply filtered off by suction through filter stones after several hours. The tricresyl phosphate purified in this manner is free from emulsifying substances so that after shaking with an equal volume of water for five minutes none of it has been absorbed.

Example 2

100 parts of the tricresyl phosphate which has been used as described in Example 1 are dissolved in 100 parts of carbon disulphide and shaken for a short time at room temperature after the addition of 1 part of 20 per cent oleum. The resulting precipitate is then separated on an acid-proof filter and the solvent removed by distillation. The residual tricresyl phosphate is then just as suitable for re-employment for the extraction of phenol as unused tricresyl phosphate.

Example 3

100 parts of the same crude tricresyl phosphate as in Example 1 are dissolved in 100 parts of carbon tetrachloride and thoroughly shaken with 2 parts of 96 per cent sulphuric acid. After removing the resulting precipitate by filtration and the solvent by distillation, the tricresyl phosphate no longer contains emulsifying substances.

Example 4

1 litre of a tricresyl phosphate used for the extraction of phenol and which is as strongly contaminated with emulsifying substances as that in Example 1 but which also contains other dissolved tarry substances is shaken with 20 cubic centimetres of 20 per cent oleum for an hour and then heated to 125° C. with moderate stirring after the addition of 40 cubic centimetres of dry precipitated calcium carbonate. After the evolution of carbon dioxide has ceased, a coarse-grained precipitate has been deposited which may very readily be filtered off. The emulsifying substances are entirely removed from the filtrate (930 cubic centimetres), the remaining substances of high molecular weight have been for the greater part precipitated and the remainder converted into a form which is non-injurious for the re-employment of the tricresyl phosphate.

Example 5

100 litres of a crude tricresyl phosphate which has been used for the extraction of phenol and which is even more contaminated than that described in Example 4 are first moderately stirred for an hour at room temperature with 4 litres of 20 per cent oleum in a vessel capable of being externally heated with steam and then heated while stirring at 125° C. after the addition of 8 litres of dry precipitated calcium carbonate. After the evolution of carbon dioxide which commences at 70° C. has ceased, the coarse-grained precipitate which has been deposited and which is readily capable of centrifuging is separated by a short centrifuging. In this manner 90 litres of purified tricresyl phosphate are obtained which is well suited for the extraction of phenol again. The residue obtained in an amount of 18.5 kilograms contains about 3 litres of extractable tricresyl phosphate which may be readily isolated therefrom and is preferably added to the crude tricresyl phosphate to be purified.

What we claim is:

1. A process for the purification of a waste tricresyl phosphate having been used for the extraction of phenols from a member of the group consisting of distillation, reduction and low temperature carbonization waste aqueous liquors and containing substances of high molecular weight which comprises separating from the said tricresyl phosphate the said substances of high molecular weight, which remain in the tricresyl phosphate after the phenols have been expelled, by precipitating them with an agent selected from the group consisting of concentrated sulphuric acid and sulphuric acid containing sulphur trioxide.

2. In the process as claimed in claim 1 precipitating the substances of high molecular weight from a waste tricresyl-phosphate which is diluted with a solvent.

3. In the process as claimed in claim 1, precipitating the substances of high molecular weight with an agent selected from the group consisting of concentrated and fuming sulphuric acid and adding an agent capable of removing the excess acid remaining in the tricresyl phosphate.

4. In the process as claimed in claim 1, precipitating the substances of high molecular weight with an agent selected from the group consisting of concentrated and fuming sulphuric acid and removing the excess acid remaining in the tricresyl phosphate by treatment with a basic neutralizing agent.

5. In the process as claimed in claim 1, precipitating the substances of high molecular weight with an agent selected from the group consisting of concentrated and fuming sulphuric acid and removing the excess of acid remaining in the tricresyl phosphate by treatment with an adsorption agent.

6. In the process as claimed in claim 1, precipitating the substances of high molecular weight with an agent selected from the group consisting of concentrated and fuming sulphuric acid and removing the excess of acid remaining in the tricresyl phosphate by treatment with a basic neutralizing agent and an adsorption agent.

7. In the process as claimed in claim 1, precipitating the substances of high molecular weight with an agent selected from the group consisting of concentrated and fuming sulphuric acid and removing the excess of acid remaining in the tricresyl phosphate by treatment with an agent capable of binding the acid and heating the mixture of the tricresylphosphate with the said agent.

8. In the process as claimed in claim 1, precipitating the substances of high molecular weight from a waste tricresylphosphate which is diluted with a solvent by means of an agent selected from the group consisting of concentrated and fuming sulphuric acid and removing the excess acid remaining in the tricresyl phosphate by treatment with an agent capable of binding the acid.

HINRICH HAVEMANN.
KARL SMEYKAL.